United States Patent
Brink et al.

(10) Patent No.: US 7,304,824 B2
(45) Date of Patent: *Dec. 4, 2007

(54) PLATED BASE PLATE FOR SUSPENSION ASSEMBLY IN DISK DRIVE

(75) Inventors: Damon D. Brink, Goleta, CA (US); Ryan J. Schmidt, Santa Barbara, CA (US); Kevin P. Hanrahan, Santa Barbara, CA (US); Jack O. Bish, Santa Barbara, CA (US)

(73) Assignee: Intri-Plex Technologies, Inc., Santa Barbara, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 10/626,197

(22) Filed: Jul. 22, 2003

(65) Prior Publication Data

US 2004/0145830 A1    Jul. 29, 2004

Related U.S. Application Data

(63) Continuation-in-part of application No. 10/241,609, filed on Sep. 10, 2002.

(51) Int. Cl.
*G11B 5/48* (2006.01)
(52) U.S. Cl. .................................... 360/244.5
(58) Field of Classification Search ............. 360/244.6, 360/244.5
See application file for complete search history.

(56) References Cited

U.S. PATENT DOCUMENTS

| | | |
|---|---|---|
| 854,724 A | 5/1907 | Dempster |
| 4,789,914 A | 12/1988 | Ainslie et al. |
| 5,344,502 A * | 9/1994 | Mack et al. ................. 148/236 |
| 5,539,596 A | 7/1996 | Fontana et al. |
| 5,591,277 A * | 1/1997 | Braunheim .................. 148/578 |
| 5,666,717 A | 9/1997 | Matsumoto et al. |
| 5,673,484 A | 10/1997 | Masaichi et al. |
| 5,689,389 A | 11/1997 | Braunheim |
| 5,771,569 A | 6/1998 | Inaba |
| 5,825,590 A | 10/1998 | Ohwe |
| 5,857,257 A | 1/1999 | Inaba |
| 5,877,919 A * | 3/1999 | Foisy et al. ............... 360/244.6 |
| 5,896,646 A * | 4/1999 | Boutaghou et al. ......... 29/603.1 |
| 6,106,688 A | 8/2000 | Miyazaki |
| 6,108,172 A * | 8/2000 | Hagen ...................... 360/245.2 |
| 6,160,684 A * | 12/2000 | Heist et al. ............... 360/244.5 |
| 6,183,841 B1 | 2/2001 | Hanrahan et al. |
| 6,226,152 B1 * | 5/2001 | Tanaka et al. ........... 360/244.6 |
| 6,231,689 B1 | 5/2001 | Fife |
| 6,231,698 B1 * | 5/2001 | Braunheim et al. ......... 148/606 |

(Continued)

*Primary Examiner*—Brian E. Miller
(74) *Attorney, Agent, or Firm*—Joshua C. Harrison; Barcelo & Harrison, LLP (57) ABSTRACT

A swage mount for a recording head suspension comprising a flange, and a hub made of a base metal extending from the flange, and at least an outer surface of the hub is plated with one or more layers of metal which provides increased retention torque, and/or increased cleanliness, and/or increased corrosion resistance. This invention may be used in conjunction with swage mounts that contain surface protrusions that are intentionally created (such as chromium nitride or chromium carbide protrusions) or not intentionally created (such as material inclusions or embedded media particles). In this case the metal plating helps prevent separation of the protrusions from the swage mount, thereby helping to prevent contamination.

14 Claims, 5 Drawing Sheets

U.S. PATENT DOCUMENTS

| | | |
|---|---|---|
| 6,351,349 B1 | 2/2002 | Braunheim et al. |
| 6,351,351 B1 | 2/2002 | Takasugi |
| 6,372,314 B1 * | 4/2002 | Schmidt et al. ............ 428/34.1 |
| 6,428,658 B1 | 8/2002 | Asano et al. |
| 6,522,505 B1 | 2/2003 | Ohwe et al. |
| 6,560,073 B1 | 5/2003 | Ohwe et al. |
| 6,754,044 B1 * | 6/2004 | Braunheim et al. ...... 360/244.6 |
| 6,958,890 B1 * | 10/2005 | Lin et al. ................. 360/244.6 |
| 2003/0156357 A1 | 8/2003 | Brink et al. |

* cited by examiner

PLATED BASE PLATE FOR SUSPENSION ASSEMBLY IN DISK DRIVE

REFERENCE TO CROSS RELATED APPLICATION

This application is a continuation-in-part of application Ser. No. 10/241,609 filed on Sep. 10, 2002, pending.

BACKGROUND OF THE INVENTION

1. Field of the Invention

This invention relates to assemblies for supporting read/write heads adjacent rotating disks in disk drives and more particularly, to a swage mount for attaching a head suspension assembly to a head actuator arm.

2. Background Information

In hard disk drives, data are stored on magnetizable surfaces of a plurality of rotatable disks that are mounted in a coaxial stack on a motor that is mounted on a housing. Transducer heads that write data to and read data from the disk surfaces are supported by an actuator that is mounted on the housing and can be actuated to position the heads in alignment with concentric data tracks defined on the disks. Each head is attached to one end of a head suspension that is connected to an actuator arm that extends from the actuator body. The suspensions include a flexible load beam constructed of light sheet steel that has a bend formed in it. The load beam acts as a spring that forces the head against the disk surface with an accurate pre-load or "gram load". Air drawn in by the rotating disks lifts the heads slightly off of the disks so that the heads fly on an air bearing across the disk surfaces. The suspension gram load counteracts the air bearing force.

The head suspension is attached to the actuator arm using a base plate (swage mount) that forms a part of the head suspension. The base plate includes a flat flange portion and a cylindrical hub portion or boss. The base plate hub is passed through a clearance hole in the load beam and the flange is spot welded to the load beam. The combined base plate, load beam and a flexure make up a head suspension.

The hubs of two suspensions are inserted into an actuator arm boss hole formed through an actuator arm extending from an actuator body, one hub entering an actuator arm boss hole from each end of the hole. A swage ball is passed through the cylindrical hubs to force the peripheries of the hubs to expand (swage) into tight engagement with the inner peripheries of the actuator arm boss hole. Thus, an actuator arm may carry two suspensions on opposite sides thereof to support two heads in opposing directions, one up and one down.

The hub is an extended boss having one end contiguous with the flange portion and the other end passing through boss clearance holes in both the load beam and the actuator arm. The hub region supplies the retention torque between the base plate, which is welded to the load beam, and the actuator arm by plastically expanding and cold working during the swaging operation, creating a press fit with the actuator arm.

Problems with this method of mounting heads have arisen as the need for increased data storage capacity in hard disk drives has grown and the size of the disk drive has decreased to fit in small lap top computers. The problem of forming a strong connection between the actuator arms and the head suspensions has been made more difficult as the size of the components has become smaller. In the prior art, relatively high swaging forces are needed to ensure that a base plate makes a strong connection with the actuator arm boss hole. As the parts get smaller and thinner, these high forces cause unacceptable large distortions in the load beam and cause pre-load changes.

One such method for reducing the overall drive size is to reduce the size of the stacked vertical joint connecting the load beam to the actuator assembly. For example, in U.S. Pat. Nos. 6,183,841 and 5,689,389, a low profile swage mount is used to connect a load beam to an actuator arm of an actuator assembly. Because the swage mount has a low profile, the overall height of the disc drive may be reduced. However, a disadvantage of using a low profile swage mount is that as performance demands increase, it provides less retention torque than is required to withstand forces applied to the load beam.

In U.S. Pat. Nos. 6,183,841 and 5,689,389 the retention torque characteristics of a low profile swage mount were increased by modifying the internal geometry of the swage mount. However, the level of retention torque that can be achieved solely by modifying the swage mount design is limited. There is a need for a low profile swage mount capable of higher retention torque values than have been previously achieved.

U.S. Pat. Nos. 6,231,689 and 6,351,349 are directed at overcoming shortcomings of the prior art. Each patent provides a surface hardened swage mount, a method of hardening the metal from which such parts are made, and for connecting a disc drive actuator arm to a load beam, which results in an increased retention torque characteristic of the swage mount.

A base plate is disclosed in copending application Ser. No. 10/037643 "Swage Mounting Using Surface Protrusions" of Ernest Swayney and Steve Braunheim in which the outer surface of the hub includes numerous protrusions that are less than approximately 50 microns in height. The protrusions are primarily comprised of a material (such as a carbide or a nitride) which is different from the stainless steel hub. Preferably, the protrusions are substantially harder (such as at least 50 hardness Vickers harder) than the base material of the hub. The purpose of the protrusions is to provide greater retention torque when the base plate is swaged to an actuator arm.

During manufacture, chromium carbide or chromium nitride is precipitated out of a base metal onto the outer surface of the hub resulting in the surface protrusions. The surface protrusions stick out of the hub outer surface and grab into the aluminum actuator arm boss hole when the hub is swaged. These and other methods of creating hardened modules on the outer hub surface can boost retention torque.

Swage mounts with carbide surface protrusions provide higher retention torque than swage mounts with nitride protrusions, but tend to shed a higher volume of particles. Due to the present emphasis on cleanliness within the industry, this currently limits the use of carbide, the most effective precipitate.

It is desirable in swage mount manufacturing to increase retention torque and yet maintain or improve cleanliness levels. Currently, the industry is moving toward nickel-plated aluminum actuator arms, because nickel-plated aluminum arms provide improved cleanliness. The need to increase retention torque is a problem especially with nickel-plated aluminum actuator arms. Accordingly, it is also desirable to increase torque in both Al and Ni-plated Al actuator arms.

During current manufacturing of base plates, the base plates are subjected to processes that remove burrs. These processes may include tumbling using porcelain beads. The reason the base plate is deburred is that a burr may flake off and contaminate the drive mechanism. Furthermore, a burr can cause the base plate to stand off and not mate with the load beam properly. Tumbling to deburr the base plate using porcelain beads that are predominately aluminum oxide may result in aluminum oxide particles becoming embedded in (yet often also protruding from) the surface of the base plate hub. Such particles may later separate from the base plate hub and enter the interior environment of the disk drive. Studies of failed disk drives have shown that aluminum oxide separating from the beads has been found on the disk surface at the site of a head crash. Even if the head does not crash, an aluminum oxide particle on the disk can present a "thermal asperity." As the head passes over the asperity during operation of the disk drive, heat associated with contact between the head and the asperity may cause a read/write error.

Manufacture of the material used to fabricate the base plates, typically stainless steel, often results in the introduction of metal oxides such as alumina and magnesia into the melt. These oxides and other contaminates in the base metal can form inclusions that may potentially be exposed at the surface of the base plate after manufacturing. These inclusions, should they become loose and fall from the base material, can pose a threat to drive operation in the form of a head crash or thermal asperity, as described above.

It is therefore desirable to cover the embedded particles and material inclusions, to prevent them from coming loose from the swage mounts during service.

SUMMARY OF THE INVENTION

A swage mount for a recording head suspension comprises a flange, a hub made of a base metal extending from the flange and having at least one surface protrusion, at least an outer surface of the hub being plated with a first metal plating, and wherein the first metal plating has a thickness ranging from two fifths of the height of the protrusion to twice the height of the protrusion.

BRIEF DESCRIPTION OF THE DRAWINGS

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE PREFERRED EMBODIMENTS

A hub is plated to improve the cleanliness and retention torque of swage mounts. Retention torque is the torque at which the base plate "breaks away" from the actuator arm. The plating can improve cleanliness levels by helping to secure surface protrusions of various types—preventing some of them from separating from the hub and contaminating the interior environment of an assembled disk drive.

The plating may include, but is not limited to, Ni, Cr, Pt, Pd, Rh, Au, Cd, W, and Ag, or combinations or layers thereof. The plating may also increase the corrosion resistance of the base metal of the swage mount.

The surface characteristics and microstructure of the plating can increase retention torque when the base plate is swaged into aluminum (Al) or nickel (Ni) plated Al actuator arms. Plating having columnar microstructure, which is rough on a small length scale, can greatly enhance retention torque. Further retention torque enhancement in Ni-plated arms can be obtained by a second plating of a hard material, such as Pt or Rh, over the microstructure produced by the underlying columnar structure of the first plating layer. This is due to the increased penetration into the Ni-plated arm afforded by the hard metal plate. This is important because Ni plated Al arms give much improved overall cleanliness, but offer lower values of torque than non-plated Al arms.

Another mechanism of retention torque improvement involves plating a soft material onto the surface of the swage mount. In this case, the softer material can deform locally and conform to the microstructural features of the arm into which the base plate is swaged. This allows an increase in the effective surface area of engagement, which tends to increase retention torque. In addition, the soft plating allows partial penetration of any asperities on the surface of the arm into the base plate, offering a second mechanism of retention torque increase. Depending on the tribological characteristics of the actuator arm itself, it is sometimes advantageous to plate a second layer over the soft plating. When the second layer is hard yet thin, the plating can still conform to the microstructural features of the arm due to the flow of the underlying soft layer. In this case, however, the hard layer of the second plating can act to penetrate the actuator arm and increase retention torque.

Plating the hub also helps to prevent disk drive head crashes, head damage and read/write errors because base metal inclusions, embedded media, and other protrusions may be secured or covered by metal plating. The metal plating keeps protrusions such as metal inclusions and embedded media from becoming loose and causing disk drive failure.

Figure 1:
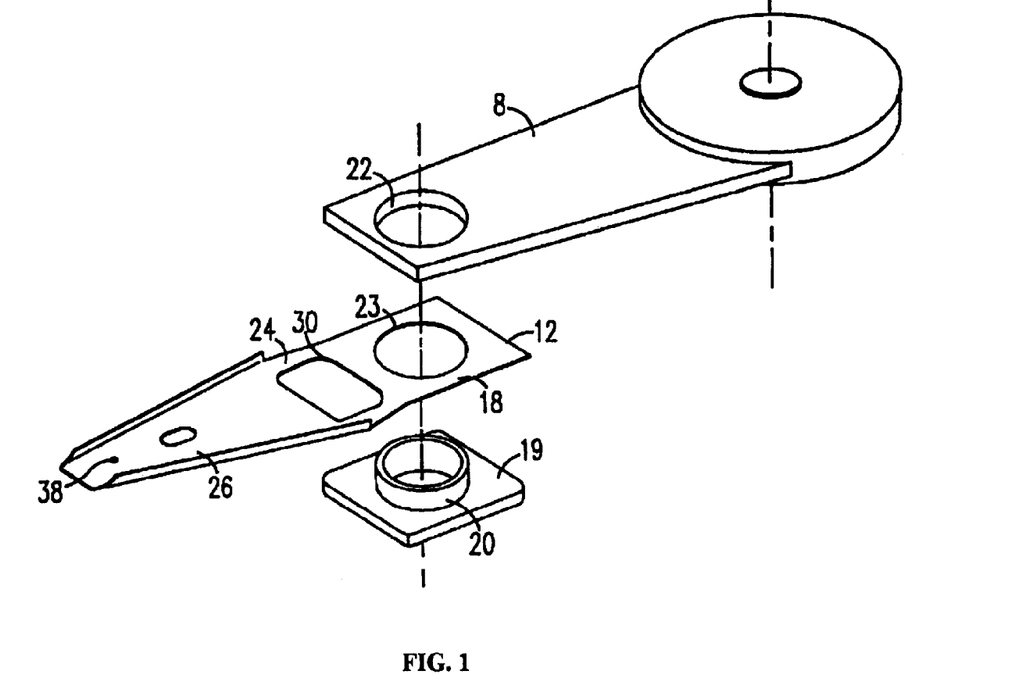
FIG. 1 is an exploded view of a disk drive magnetic head suspension in which the present invention is embodied.

A disk drive has an actuator arm assembly and a stack of spaced-apart disks rotatable about a common shaft. The actuator arm assembly is rotatable about an actuator arm axis. The arm assembly includes a plurality of actuator arms, which extend into the spaces between the disks. One such actuator arm is shown in FIG. 1. Attached to the actuator arm is a magnetic head suspension. The actuator arm 8 when assembled in a stack with a number of identical actuator arms rotates about the actuator arm axis 6.

The magnetic head suspension comprises a resilient load beam 12, a gimbal (not shown) and a load beam 12. The load beam 12 includes a base section 18 having a boss hole 23. The load beam 12 includes a resilient section 24 located between the base section 18 and a protrusion section 26 of the load beam 12. The resilient section 24 is formed to create an angular offset between the base section 18 and protrusion section 26. The degree of bending determines the downward preload force pressing the head (not shown) toward the disk surface (not shown). The geometry of the load beam in resilient section 24 and/or the size of an aperture 30 in the resilient section 24 establishes the resilience of the load beam 12. A dimple 38 allows gimbaling of the head while transmitting the pre-load force to the head.

Figure 2:
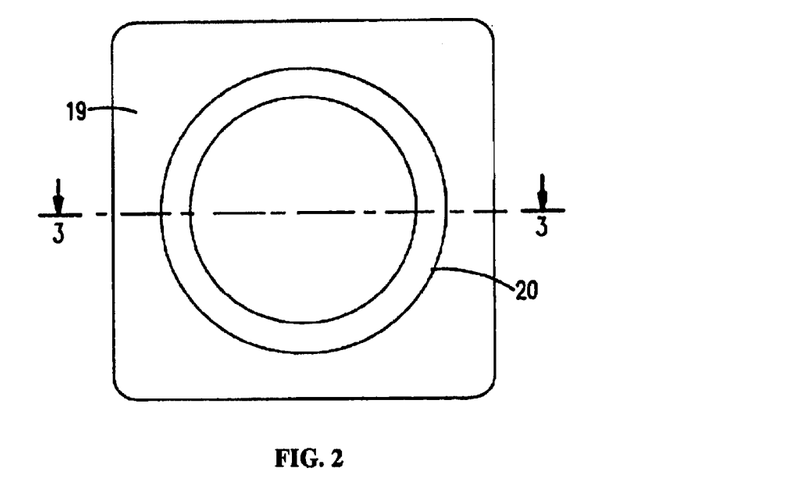
FIG. 2 is a top view of the base plate show in FIG. 1.

The actuator arm 8 and load beam 12 are connected end to end by the base plate (swage mount) which includes a flat flange portion 19 and a cylindrical hub portion or boss 20. A top view of the base plate is shown in FIG. 2. The hub 20 is inserted through a load beam boss hole 23 and the flange portion 19 is welded to the load beam 12. The hub 20 is then inserted through an actuator arm boss hole 22. Using a swage machine, a swage ball is driven through the hub 20. The swage ball exerts pressure on the interior of hub 20, which expands (swages) into the boss hole in the actuator arm. The expanded hub rigidly connects the hub 20 and attached load beam 12 to the actuator arm boss hole 22. The expanded hub 20 creates a very tight friction fit against the sides of the boss hole 22. To ensure a tight fit, the length of the hub 20 is such that sufficient contact exists between the outer portion of the hub 20 and the inner portion of the boss hole 22. As the hub plastically deforms, it hardens, which is desirable for maintaining a press fit in the actuator arm boss hole.

The actuator arm 8 is typically made of aluminum and can be nickel-plated, because nickel-plated aluminum arms provide improved overall cleanliness.

As base plates are designed to be smaller to accommodate the geometries of smaller disk drives, reduced retention torque becomes a problem. A base plate is disclosed in the above identified application Ser. No. 10/037,643 in which the outer surface of the hub includes numerous protrusions that are less than approximately 50 microns in height. The protrusions are primarily comprised of a material (such as a carbide or a nitride) which is different from the stainless steel hub. Preferably, the protrusions are substantially harder (such as at least 50 hardness Vickers harder) than the base material. The purpose of the protrusions is to provide greater retention torque when the base plate is swaged to an actuator arm.

When a swage ball is forced through the inner barrel of the hub 20, the applied swage force and resulting stress may cause the protrusions to separate from the hub and later contaminate the disk drive assembly.

In a first embodiment of the present invention a base plate component is manufactured as follows:

(1) A base plate comprising a flange 19 having a first side and a second side, and a hub 20, is formed primarily comprised of a base metal such as 300 series stainless steel, the hub extending from the second side of the flange and having an inner surface and an outer surface, (2) The base plate is heat-treated but in such a way as to not form surface protrusions.

(3) Using a barrel-plating technique, multiple base plates are cleaned using an alkaline surfactant. This entails submerging the base plates in a solution of sodium hydroxide or equivalent at a temperature of 150 degrees F. to remove gross debris. The base plates are then rinsed with deionized (DI) water by rotating the barrel in a rinse station for two minutes.

(4) Remaining in the barrel, the base plates are placed into an 80% sulfuric acid bath at room temperature as a cleaning and activation step. The base plates are then rotated in a barrel, submerged, for between 8 and 10 minutes with an applied potential of 4 volts. The base plates are then rinsed to remove residual acids by submerging the barrel, with rotation, in DI water for two minutes.

(5) A nickel strike is then placed on the base plates by placing the barrel in a low concentration Wood's bath, consisting of between 10 to 15 oz/gal nickel chloride and 15% hydrochloric acid. The base plates are submerged and rotated for 15 minutes and a current density of 1 ASF. The base plates are rinsed as previously described.

(6) The base plates are then transferred to a Watt's Ni bath that consists of 7-10 oz/gal nickel chloride, 30-40 oz/gal nickel sulphate, and 4-6 oz/gal boric acid. The temperature of the bath is held at a temperature of 135 F. The base plates are submerged and rotated for 21 minutes at a current density of 2.5 ASF to achieve a plating thickness between 30 to 40 micro-inches. This combination of operating parameters results in a rough, columnar plating that has a dull appearance. This rough microstructure enhances frictional characteristics. The base plates are then rinsed as described previously.

(7) Following the rinse, the base plates are placed in a second Watt's bath that contains, in addition to the above, approximately 50 ppm of sacharrine that acts as a brightener. The base plates are submerged and rotated for 10 minutes and a current density of 4 ASF to achieve a brighter surface finish.

(8) The base plates are then rinsed, dried and inspected.

In a second embodiment of the present invention, a base plate component is manufactured as follows: Steps 1-6 set forth above remain the same and the following manufacturing steps are then performed:

(7) The base plates are placed in a Rhodium bath that contains 1.3-2 g/L rhodium sulfate and 25-80 ml/L sulfuric acid. The bath is held at a temperature of 130 degrees F. The base plates are plated to a thickness of between 3-9 micro-inches, which offers a hard coating over the rough Watts structure that allows penetration into a Ni plated arm upon swaging and greatly improves retention torque.

(8) The base plates are then rinsed, dried and inspected.

Figure 3:
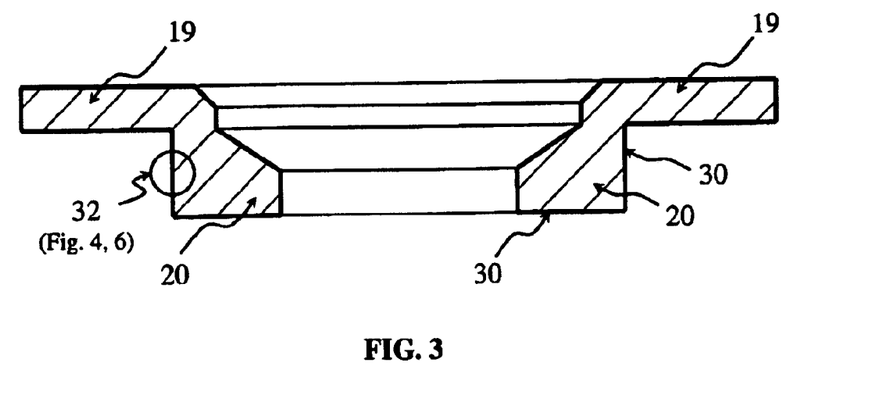
FIG. 3 is a side elevation view of the base plate of FIG. 2 along the view line 3-3.

Refer to FIG. 3, which is a side cross-sectional view of the base plate of FIG. 2 along the view line 3-3. If necessary to meet tolerances, the base plate hub is made smaller than usual for swaging in the actuator arm boss hole 22 and is nickel plated to a thickness that makes up the difference. The nickel plate is illustrated by the bold lines of FIG. 3.

Figure 4:
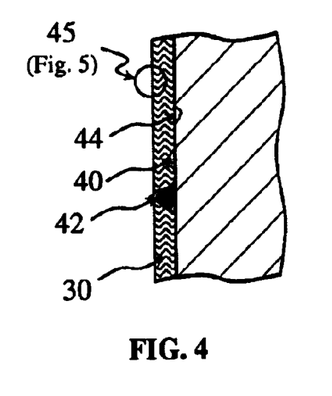
FIG. 4 is an expanded view of a portion of the base plate of FIG. 3.

Refer to FIG. 4, which is an expanded view of a circled portion 32 of the base plate of FIG. 3. The nickel plating 30 is of a thickness that covers the particle 44 embedded in the stainless steel hub 20, covers the hub outer surface protrusion 40, and partially covers hub outer surface protrusion 42.

Figure 5:
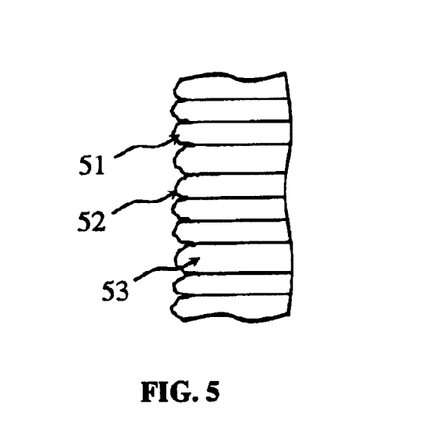
FIG. 5 is a diagram showing surface roughness and columnar structure.
Figure 6:
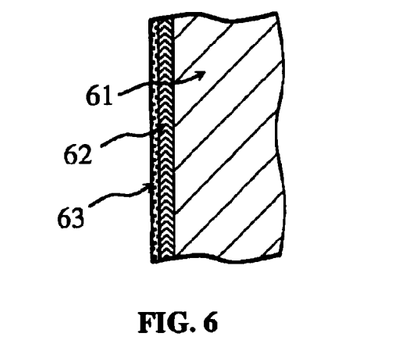
FIG. 6 is a diagram showing multiple layers of plating.

Refer to FIG. 5, which is an expanded view of a circled portion 45 of the Ni plating in FIG. 4. The diagram shows a surface roughness and columnar structure wherein several column tips 51, 52 are depicted and form the terminus of individual columns 53 in the metal plating;

Refer to FIG. 6, which is a diagram showing multiple layers of plating wherein the base metal 61 of the swage mount is covered by a first metal plating 62 and a second metal plating 63.

Figure 7:
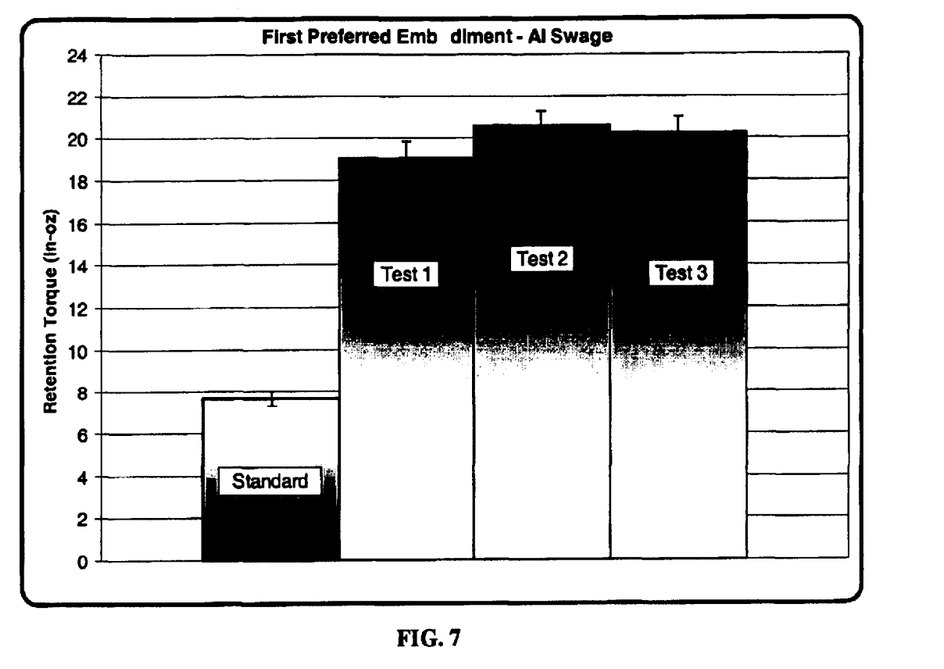
FIG. 7 is a torque performance graph of a base plate manufactured in accordance with the first preferred embodiment of the present invention.

Refer to FIG. 7, which is a retention torque performance graph of a base plate manufactured in accordance with the first preferred embodiment of the present invention. The data were gathered using a Universal Swage Tester unit designed and built by Intri-Plex Technologies and reflect the retention torque of base plates fabricated according to an embodiment of the present invention compared to the retention torque of a standard unplated base plate. In this test, the base plates are swaged into aluminum (or nickel plated aluminum) coupons and a torque is applied on the base plate that tends to rotate the base plate with respect to the coupon. Using a displacement sensor, the torque at which the base plates "break away" from the coupon are measured and recorded. The approximately 100% increase in "break away" torque associated with the test is repeated across three separate groups, revealing the consistency of the improvement.

Figure 8:
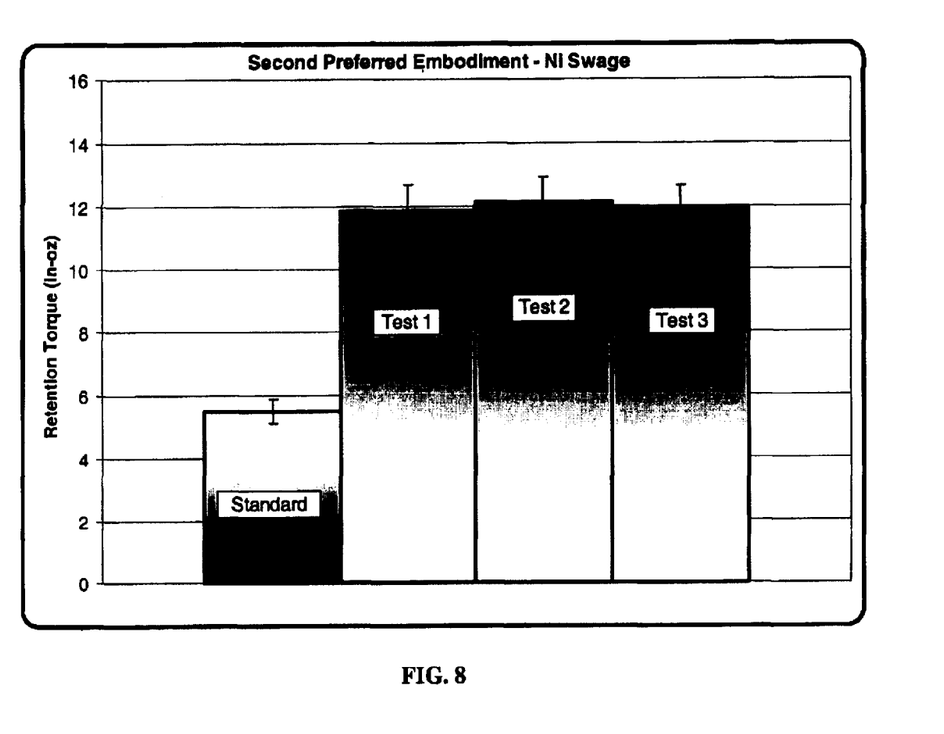
FIG. 8 is a torque performance graph of a base plate manufactured in accordance with the second preferred embodiment of the present invention.

Refer to FIG. 8, which is a retention torque performance graph of a base plate manufactured in accordance with the second preferred embodiment of the present invention. The data were gathered using a Universal Swage Tester unit designed and built by Intri-Plex Technologies and reflect the retention torque of base plates fabricated according to an embodiment of the invention compared to the retention torque of a standard unplated base plate. In this test; the base plates are swaged into nickel-plated aluminum coupons and a torque is applied on the base plate that tends to rotate the base plate with respect to the coupon. Using a displacement sensor, the torque at which the base plates "break away" from the coupon are measured and recorded. The approximately 100% increase in "break away" torque associated with the test is repeated across three separate groups, revealing the consistency of the improvement.

The method of manufacturing swage mounts according to an embodiment of the present invention can be summarized as follows:

A. Forming a flange 19 having a first side and a second side, and a hub 20, primarily comprised of a base metal such as 300 series stainless steel, extending from the second side of the flange and having an inner surface and an outer surface, B. Optionally creating on the outer surface of the hub numerous protrusions 40, 42, that are less than approximately 50 microns in height and that are primarily comprised of a material such as a carbide or a nitride which is different from the base metal;

C. Plating the outer surface of the hub with a first metal such as nickel to a thickness that is sufficient to cover or prevent separation of surface oxides and other contaminates and/or protrusions from the hub; and, D. Optionally, plating the plated outer surface of the hub with a second metal.

At least four different types of protrusions may be present on the surface of a hub, as shown in Table 1. Embedded media protrusions (such as alumina from beads used in the deburring

TABLE 1

Plating Heights Required to Secure or Cover Four Types of Protrusions

| Protrusion Type | Protrusion Height Range | Plating to Secure | Plating to Cover |
|---|---|---|---|
| Chromium Carbide | 0.25-50 μm | 0.10-40 μm | 0.5-50 μm |
| Chromium Nitride | 0.05-50 μm | 0.02-40 μm | 0.05-50 μm |
| Embedded Media | 0.02-10 μm | 0.01-9 μm | 0.2-20 μm |
| Material Inclusions | 0.02-5 μm | 0.01-4 μm | 0.2-10 μm | process) typically exist in a distribution of heights with a maximum height that is typically within the range of 0.02 to 10 μm. Thus, a plating thickness providing a means to secure the protrusions may be found within the range 0.01 to 9 μm, whereas a plating thickness providing a means to cover the protrusions may be found within the range 0.2 to 20 μm. Thickness values which provide a means to secure or cover chromium carbide, chromium nitride and material inclusions (such as metal oxides present in purchased stainless steel) are also shown in Table 1. Of course, the thickness necessary to secure or cover a protrusion in any particular embodiment depends on the height of the protrusion and may fall outside of the ranges shown in Table 1.

The thickness values shown in Table 1 also provide a means to reduce particulate contamination in the disc drive and/or a means to reduce the corrosion of the base metal. Metal plating that covers or secures protrusions reduces particulate contamination by preventing these protrusions from separating and entering the interior environment of the disc drive. Metal plating that covers or secures protrusions reduces corrosion by reducing or preventing exposure of the surface to the atmosphere.

One skilled in the art will recognize that there are many well known and widely used methods to characterize the plated surface. For example, cross-sections or x-ray fluorescence techniques can be used to determine the plating thickness. Corrosion resistance may be measured by the well known "MIL" standard corrosion test. Hardness can be determined from the load displacement curve that is observed when an instrument, such as the Nano Hardness Tester, applies an increasing load to drive an indentor tip into a sample. Surface roughness can be determined by any number of well known contact methods, such as stylus profilometry, or non-contact methods, such as scanning tunneling microscopy, atomic force microscopy, scanning probe microscopy, optical interference profilometry, and near-field scanning optical microscopy. A surface roughness value, Ra, can be calculated by determining the average value of the height of the surface profile above and below a centerline throughout a prescribed sampling length.

Particle count, sizes, and security can be determined by several well-known methods. For example, the hub may be subjected to high intensity ultrasonic cleaning in water. The water containing the removed particles can then be analyzed by a liquid particle counter system (LPC) that determines the sizes and counts of the particles using the principle of light scattering. Alternately, the particles can be analyzed by hard particle analysis (HPA) wherein the water containing the removed particles is filtered and the collected particles analyzed by scanning electron microscopy (SEM) or energy dispersive x-ray spectroscopy (EDS). Ultrasonic cleaning followed by LPC, SEM or EDS can also be used to determine whether surface protrusions are secure. The amount of particles that are removed by ultrasonic cleaning is an indication of whether surface protrusions are secure. This characteristic can also be determined by the well known Tape Test. Tape is placed on the hub, removed and then viewed by SEM to determine the type and amount of particles that appear on the surface of the tape. SEM can also be used to directly view the surface of the hub and determine whether the metal plating is covering the hub protrusions.

Figure 9:
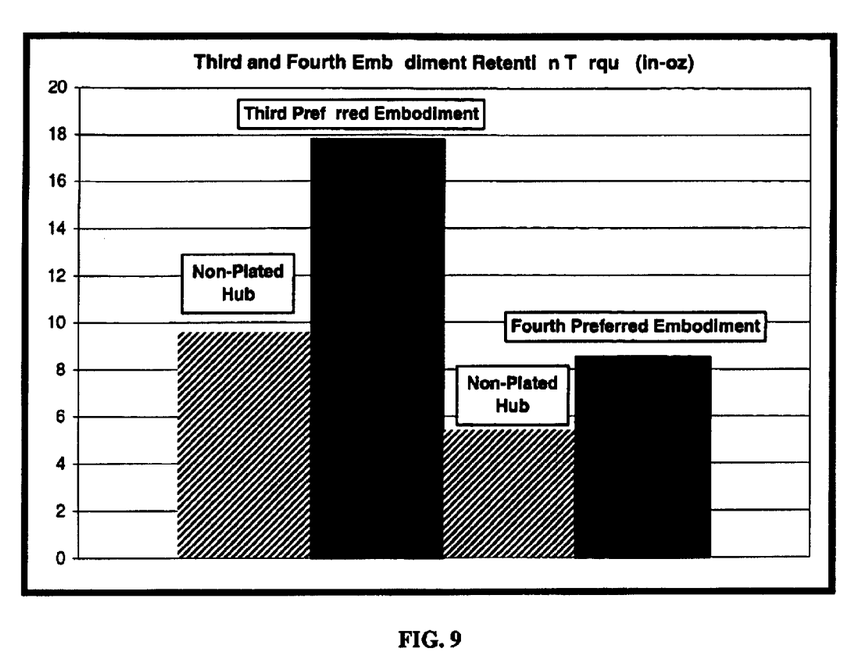
FIG. 9 is a torque performance graph of base plates manufactured in accordance with the third and fourth preferred embodiments of the present invention.
Figure 10:
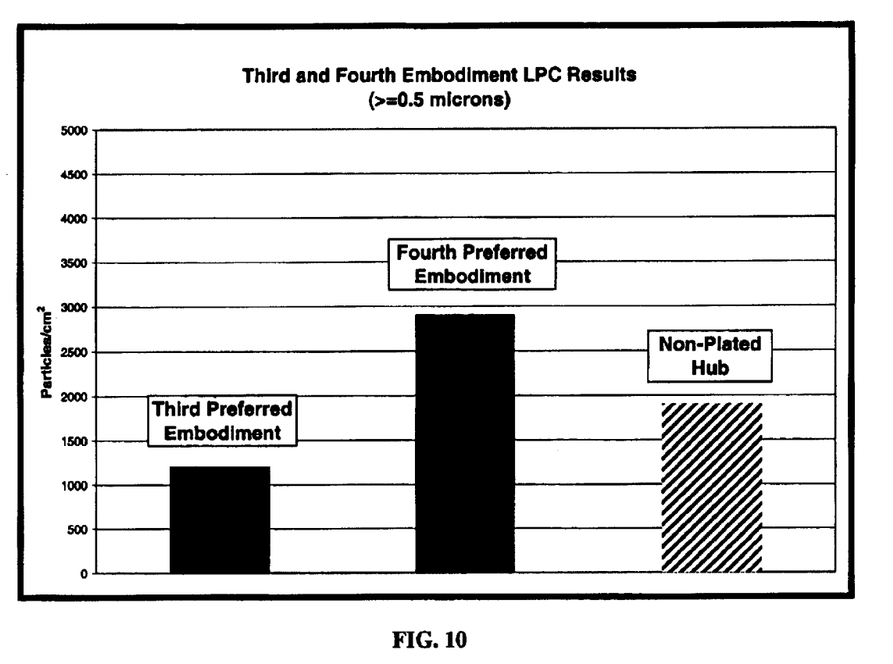
FIG. 10 is a cleanliness performance graph of base plates manufactured in accordance with the third and fourth preferred embodiments of the present invention, focusing on the security of protrusions $\geq 0.5$ um.
Figure 11:
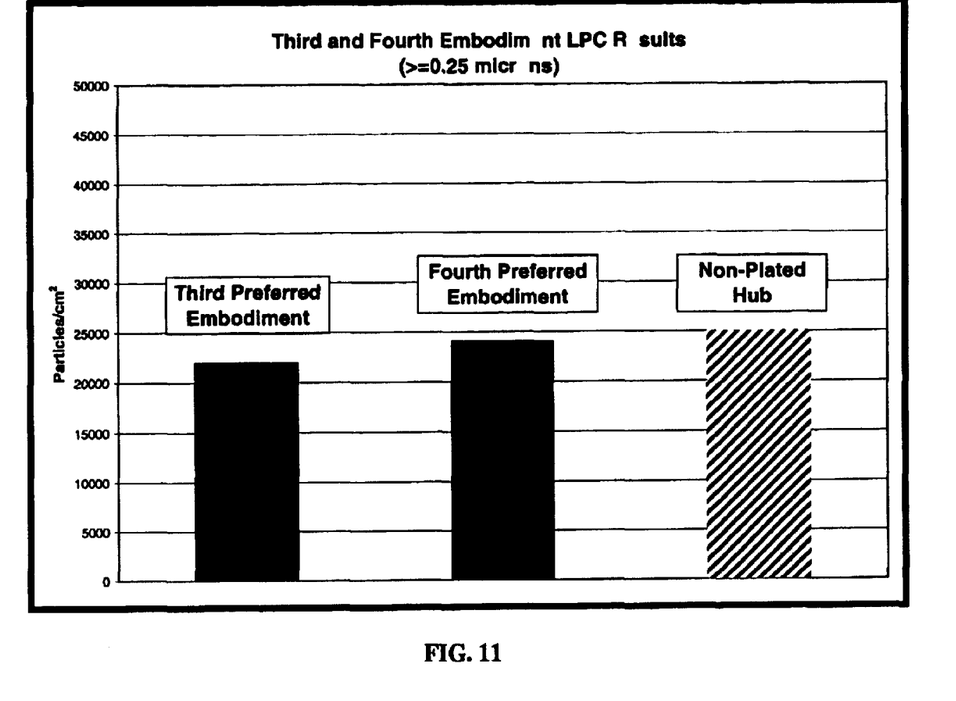
FIG. 11 is a cleanliness performance graph of base plates manufactured in accordance with the third and fourth preferred embodiments of the present invention, focusing on the security of protrusions $\geq 0.25$ um.

In a third embodiment of the present invention, a stainless steel hub containing embedded media at an average height of 0.85 µm and material inclusions at an average height of 0.2 µm is plated with 2.0 µm of nickel. Referring to FIG. 9, the retention torque of this plated hub was tested and found to be 18.0 in-oz, whereas the retention torque of a non-plated hub was 9.5 in-oz. In addition, the corrosion resistance of the plated hub was found to be equivalent to or greater than the non-plated hub. LPC testing indicated that the security of the embedded media and material inclusions on the surface of the hub was enhanced by the plating. Referring to FIGS. 10 and 11, water exposed to the plated hub during ultrasonic cleaning was found to contain only 1,200 particles of a size greater than 0.5 microns and 22,000 particles greater than 0.25 microns per square centimeter of water. Water exposed to a non-plated hub (which had previously been cleaned to remove most surface protrusions) contained 1,900 particles greater than 0.5 microns and 25,000 particles greater than 0.25 microns per square centimeter of water.

Similar results were obtained when the hub contained material inclusions in the absence of embedded media. The retention torque was 19.0 in-oz, whereas the retention torque of a non-plated hub was 10.5 in-oz. In addition, the corrosion resistance of the plated hub was found to be equivalent to or greater than the non-plated hub. LPC testing indicated that the security of the material inclusions on the surface of the hub was enhanced by the plating. Water exposed to the plated hub during ultrasonic cleaning was found to contain only 1,100 particles of a size greater than 0.5 microns and 20,000 particles greater than 0.25 microns per square centimeter of water. Water exposed to a non-plated hub (which had previously been cleaned to remove most surface protrusions) contained 2,000 particles greater than 0.5 microns and 26,000 particles greater than 0.25 microns per square centimeter of water.

In a fourth embodiment of the present invention, a stainless steel hub containing embedded media at an average height of 0.85 µm and material inclusions at an average height of 0.2 µm is plated with 1.5 µm of nickel and 0.2 µm of rhodium (although platinum, cadmium, chromium, tungsten or electroless nickel may also be used). Referring to FIG. 9, when tested with Ni plated coupons, the retention torque of this plated hub was found to be 8.5 in-oz, whereas the retention torque of a non-plated hub was 5.5 in-oz. In addition, the corrosion resistance of the plated hub was found to be equivalent to or greater than the non-plated hub. LPC testing and subsequent HPA testing indicated that the security of the embedded media and material inclusions on the surface of the hub was enhanced by the plating. Referring to FIGS. 10 and 11, water exposed to the plated hub during ultrasonic cleaning was found to contain only 2,900 particles of a size greater than 0.5 microns and 24,000 particles greater than 0.25 microns per square centimeter of water. Water exposed to a non-plated hub (which had previously been cleaned to remove most surface protrusions) contained 1,900 particles greater than 0.5 microns and 25,000 particles greater than 0.25 microns per square centimeter of water. Although the 0.5 micron particle counts were higher on the plated hub, subsequent HPA analysis revealed that these particles did not correspond to embedded media or material inclusions.

Similar results were obtained when the hub contained material inclusions in the absence of embedded media. When tested in Ni plated coupons, the retention torque was 9.0 in-oz, whereas the retention torque of a non-plated hub was 5.8 in-oz. In addition, the corrosion resistance of the plated hub was found to be equivalent to or greater than the non-plated hub. LPC testing and subsequent HPA testing indicated that the security of the material inclusions on the surface of the hub was enhanced by the plating. Water exposed to the plated hub during ultrasonic cleaning was found to contain only 2,800 particles of a size greater than 0.5 microns and 22,000 particles greater than 0.25 microns per square centimeter of water. Water exposed to a non-plated hub (which had previously been cleaned to remove most surface protrusions) contained 2,000 particles greater than 0.5 microns and 26,000 particles greater than 0.25 microns per square centimeter of water. Although the 0.5 micron particle counts were higher on the plated hub, subsequent HPA analysis revealed that these particles did not correspond to embedded media or material inclusions.

While the invention has been particularly shown and described with reference to preferred embodiments thereof, it will be understood by those skilled in the art that the foregoing and other changes in form and detail may be made therein without departing from the scope of the invention.

What is claimed is:

1. A swage mount for a recording head suspension comprising:
   a flange;
   a hub extending from the flange and having an outer surface comprising a base metal, the hub having at least one surface protrusion protruding from the outer surface of the base metal, the at least one surface protrusion comprising a protrusion material that is different from and harder than the base metal;
   at least the outer surface of the base metal being plated with a first metal plating that has a thickness that is at least two fifths of the height of the at least one surface protrusion but no more than twice the height of the at least one surface protrusion.

2. The swage mount of claim 1 wherein the surface roughness, Ra, of the first metal plating is at least 5% of the thickness of the first metal plating.

3. The swage mount of claim 1 wherein the first metal plating is harder than the base metal by at least 5 Vickers hardness numbers.

4. The swage mount of claim 1 comprising a second metal plating, applied over the first metal plating.

5. The swage mount of claim 1 wherein the first metal plating has a thickness in the range 0.01 to 9 microns.

6. The swage mount of claim 1 wherein the first metal plating has a thickness in the range 0.02 to 40 microns.

7. The swage mount of claim 1 wherein the first metal plating has a columnar structure.

8. The swage mount of claim 1 wherein the protrusion material comprises a material selected from the group consisting of chromium carbide and chromium nitride.

9. The swage mount of claim 1 wherein the base metal comprises stainless steel and the first metal plating comprises nickel.

10. A swage mount for a recording head suspension comprising:
- a flange;
- a hub extending from the flange and having an outer surface comprising a base metal, the hub having at least one surface protrusion protruding from the outer surface of the base metal, the at least one surface protrusion comprising a protrusion material that is different from and harder than the base metal;
- at least the outer surface of the base metal being plated with a first metal plating that has a thickness that is at least two fifths of the height of the at least one surface protrusion but no more than twice the height of the at least one surface protrusion,
- the swage mount further comprising a second metal being plating over the first metal plating,
- wherein the second metal plating is harder and thinner than the first metal plating.

11. The swage mount of claim 10 wherein the first metal plating comprises a material selected from the group consisting of cadmium, chromium, tungsten, and nickel.

12. The swage mount of claim 10 wherein the second metal plating comprises a material selected from the group consisting of rhodium and platinum.

13. The swage mount of claim 10 wherein the at least one surface protrusion is harder than the base metal by at least 50 Vickers hardness numbers.

14. The swage mount of claim 10 wherein the first metal plating has a thickness in the range 0.05 to 50 microns.

* * * * *